United States Patent [19]

Miyamoto et al.

[11] 3,728,702
[45] Apr. 17, 1973

[54] TEMPERATURE ALARM UTILIZING PAIRED POSITIVE AND NEGATIVE COEFFICIENT THERMISTORS

[75] Inventors: Mamoru Miyamoto, Neyagawa; Minoru Takaichi, Suita, both of Japan

[73] Assignee: Matsushita Electric Industrial Co., Ltd., Kadoma-shi, Osaka, Japan

[22] Filed: Dec. 7, 1970

[21] Appl. No.: 95,635

[30]   Foreign Application Priority Data

Dec. 11, 1969   Japan ..............................44/118195

[52] U.S. Cl......................340/228 R, 73/362, 317/41
[51] Int. Cl............................................G08b 21/00
[58] Field of Search......................340/228; 73/362.1–362.7, 362 AR, 359; 317/41

[56]         References Cited

UNITED STATES PATENTS

| | | | |
|---|---|---|---|
| 3,363,466 | 1/1968 | Guidi | 73/362 AR X |
| 3,186,229 | 6/1965 | Liben | 73/399 X |
| 2,175,890 | 10/1939 | Glowatzki | 324/106 X |
| 3,444,399 | 5/1969 | Jones | 317/41 X |

*Primary Examiner*—John W. Caldwell
*Assistant Examiner*—William M. Wannisky
*Attorney*—Stevens, Davis, Miller & Mosher

[57]         ABSTRACT

An engine temperature warning device which detects the temperature of an engine by means of a thermosensitive element comprising the combination of a negative characteristic thermistor and a positive characteristic thermistor which are thermosensitive semiconductor resistors to operate a contactless electronic solid state switching circuit to energize and de-energize a warning lamp.

1 Claim, 4 Drawing Figures

PATENTED APR 17 1973

M. MIYAMOTO
AND
M. TAKAICHI
INVENTOR

BY *Stevens, Davis, Miller & Mosher*
ATTORNEYS

TEMPERATURE ALARM UTILIZING PAIRED POSITIVE AND NEGATIVE COEFFICIENT THERMISTORS

The present invention relates to an improvement in an engine temperature warning device.

A conventional engine temperature warning device is such that a bimetallic strip provided at its pair of tips with contacts detects the engine temperature to energize an electric lamp by closing the contacts at a predetermined low or high temperature. Since this device has many mechanical parts, it may be damaged by vibrations. Moreover, since this device has contacts provided to the bimetallic switch for energizing and de-energizing the warning lamp, there is a problem as to its durability and chattering occurs. Thus, the conventional engine temperature warning device is less reliable than desired.

An object of the present invention is to provide an engine temperature warning device which is durable, free from the influence of engine vibrations, free from chattering, accurate in operation, and reliable.

The above object is attained in the present invention by detecting the temperature of an engine by means of a thermosensitive element comprising the combination of thermistors of positive and negative characteristics to operate a contactless electronic solid state switching circuit to energize and deenergize a warning lamp.

The present invention will become more apparent from the following detailed description of the preferred embodiments of the present invention when taken in conjunction with the accompanying drawings, in which.

Figure 1:
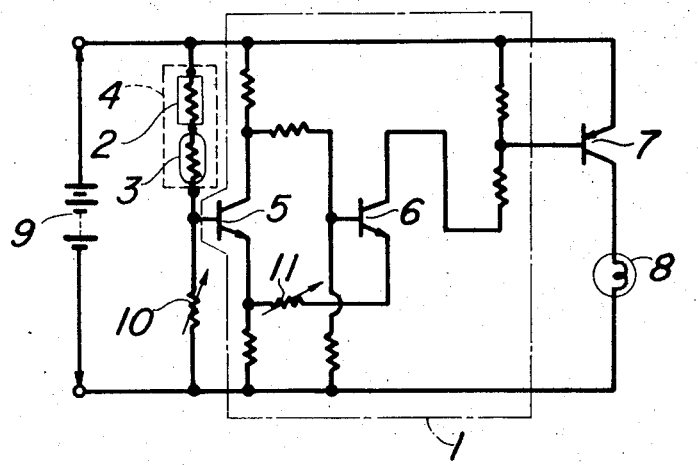
FIG. 1 is a circuit diagram of an embodiment of the engine temperature warning device according to the present invention.

Referring to FIG. 1 a detector 4 comprising a series combination of a negative characteristic thermistor 2 and a positive characteristic thermistor 3, which are thermosensitive semiconductor resistors, detects the temperature of an engine to generate a signal which operates a Schmitt circuit 1 comprising preliminary and subsequent stage transistors 5 and 6, respectively to perform switching. The signal from the Schmitt circuit 1 is amplified by a last stage transistor 7 to energize a warning lamp 8. The detector 4 is connected in parallel with a variable resistor 10 between a power source 9 and the base of the preliminary stage transistor 5. The variable resistor 10 adjusts the operating point of the temperature at which the warning lamp 8 is lit or extinguished. A variable resistor 11 connected between the emitters of the transistors 5 and 6 adjusts the hysteresis width of the temperature at which the lamp 8 is lit or extinguished. The conductive and non-conductive states of the transistor 6 control those of the transistor 7 to energize or de-energize the warning lamp 8.

Figure 2:
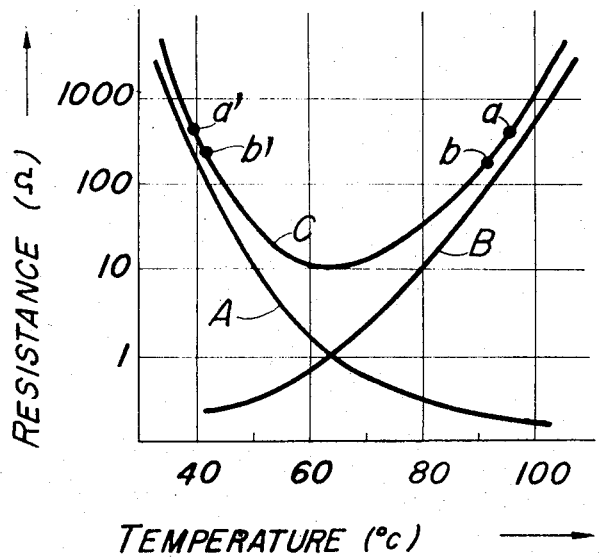
FIG. 2 is a resistance versus temperature characteristic of the temperature detecting part of the embodiment of FIG. 1.

In FIG. 2 the curve A represents a resistance versus temperature characteristic of the negative characteristic thermistor 2, the curve B represents a resistance versus temperature characteristic of the positive characteristic thermistor 3, and the curve C represents a resistance versus temperature characteristic of the detector 4 which comprises a series connection of the negative characteristic thermistor 2 and the positive characteristic thermistor 3. The curve C is a synthesized one of the curves A and B.

In operation, when the engine temperature is at a low level and the resistance of the detector 4 is higher than the point $a'$ on the curve C in FIG. 2, the transistor 5 of the Schmitt circuit 1 is non-conductive because the base potential of the transistor 5 is lower than a preset operating point. As a result, the transistor 6 becomes conductive, which makes the last stage transistor conductive to energize the warning lamp 8. When the temperature of the engine rises and the resistance of the detector 4 becomes lower than the point $b'$ on the curve C, the transistor 5 becomes conductive because the base potential of the transistor 5 rises. Then the transistor 6 turns off and the transistor 7 also turns off to extinguish the warning lamp 8. When the temperature of the engine further rises to put the resistance of the resistor 4 at a higher value than the point a on the curve C, the base potential of the transistor 5 becomes lower than the operating point to make the transistor 5 non-conductive. Then the transistor 6 turns on to energize the warning lamp 8 through the transistor 7 being in a conductive state.

In case the temperature of the engine falls from a high level, the operation of the device is as follows. When the resistance of the detector 4 becomes lower than the point $b$ on the curve C, the base potential of the transistor 5 becomes higher than the operating point to put the transistor 5 in a conductive state. The transistors 6 and 7 are then made non-conductive, and the warning lamp 8 is de-energized. In a similar manner, the variation in the temperature of the engine is detected by the detector 4, and the warning lamp 8 is energized or de-energized by the Schmitt circuit 1. As has been stated above, the temperature at which the warning lamp 8 is energized or de-energized is adjusted by the variable resistor 10, and the latitude of the temperatur of the energization and de-energization of the warning lamp 8 is adjusted by the variable resistor 11.

Figure 3:
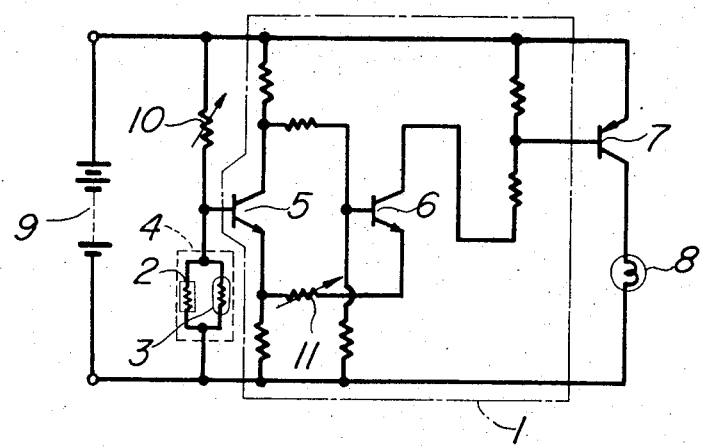
FIG. 3 is a circuit diagram of another embodiment of the engine temperature warning device according to the present invention.

FIG. 3 shows another embodiment of the present invention similar to the embodiment of FIG. 1 except that the negative characteristic thermistor 2 and the positive characteristic thermistor 3 of the detector 4 are in paralled connection in contrast to the series connection in FIG. 1.

Figure 4:
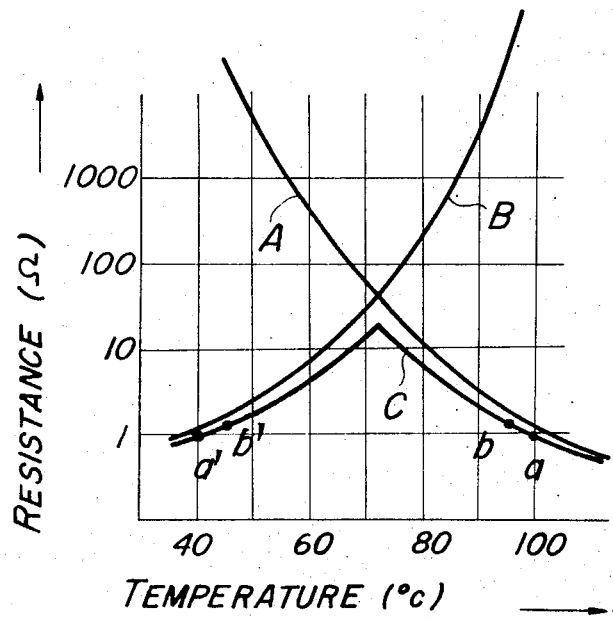
FIG. 4 is a resistance versus temperature characteristic of the temperature detecting part of the embodiment of FIG. 3.

The operation of this embodiment is similar to that of the device of FIG. 1 except that the warning lamp 8 is energized when the resistance of the detector 4 is lower than the point $a'$ or a on the curve C in FIG. 4, which shows similar curves to those in FIG. 2, and the warning lamp 8 is de-energized when the resistance of the detector 4 is higher than the point $b'$ or b.

In any case, according to the present invention the warning lamp is energized at temperatures below and above or outside the predetermined favorable temperature range.

What is claimed is:

1. An engine temperature warning device comprising a temperature detector including a pair of thermistors of positive and negative characteristics, a switching circuit consisting of a Schmitt circuit including a pair of transistors, the base of the first transistor of said Schmitt circuit being connected to a DC power source through said detector, a variable resistor connected in series with said detector across said DC power source for setting said temperature range, said base of said first transistor being connected to a junction point of said detector and said variable resistor, and another variable resistor connected between the emitters of said pair of transistors of said Schmitt circuit in series therewith for setting the hysteresis width of the energization and deenergization of said lamp, an amplifying transistor connected to the second transistor of said Schmitt circuit for amplifying a signal from said Schmitt circuit, and a warning lamp connected to said amplifying transistor, said lamp being energized by the output of said amplifying transistor at temperatures outside a predetermined temperature range.

* * * * *